Patented Jan. 15, 1946

2,392,935

UNITED STATES PATENT OFFICE 2,392,935

PURIFICATION OF MERCAPTOTHIAZOLES

Roger A. Mathes, Akron, Ohio, assignor to The B. F. Goodrich Company, New York, N. Y., a corporation of New York No Drawing. Application June 21, 1943,
Serial No. 491,661

7 Claims. (Cl. 260—302)

This invention relates to the purification of mercaptothiazoles and pertains more specifically to the steam distillation of an aqueous alkaline solution of such compounds.

The mercaptothiazoles are well known to be accelerators for the vulcanization of rubber. Any rubber, either natural or synthetic, which may be vulcanized with sulfur may be treated with these compounds. It has been observed, however, that certain mercaptothiazoles, particularly those having the following structural formula:

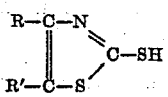

in which R and R' are hydrogen, hydrocarbon, or alkoxy groups, such as the mercaptoalkylthiazoles, often contain an impurity which causes prevulcanization of the rubber composition, and which possesses a particularly penetrating and offensive odor. This impurity, the precise chemical composition of which is unknown, can be removed by recrystallization of the mercaptothiazoles from a suitable solvent. However, such a process is entirely too expensive for use on a commercial scale. Attempts to remove the impurities by suspending the mercaptans in water and passing steam through the mixture have been unsuccessful. Likewise, solution of the mercaptans in a caustic solution followed by reprecipitation with acids has also failed to remove the impurities.

I have now discovered that a combination of two of the above-described unsuccessful methods provides substantially complete removal of the undesirable impurities. More specifically, solution of the mercaptans in aqueous alkaline solutions followed by passage of steam therethrough for a short period of time provides substantially complete separation of the impurities from the mercaptans.

The method of my invention is particularly applicable to the mercaptothiazoles having the general formula as set forth above. The preparation of these compounds has been fully described in the literature and consists, in general, of reacting an alpha-haloketone or ketoester with an alkali metal or ammonium salt of dithiocarbamic acid. For example, there may be employed such ketones as chloroacetone, 1-chlorobutanone-2; 3-chloro-butanone-2; phenacyl chloride; p-methyl-phenacyl chloride; alpha-chloro-cyclohexanone; alpha-chlorocyclopentanone; ethyl alpha-chloroacetoacetate; methyl alpha-chloroacetoacetate, or the like.

Among the specific mercaptothiazoles, to which my process may be applied, are 2-mercapto-4-methylthiazole
2-mercapto-4,5-dimethyl thiazole
2-mercapto-4-ethylthiazole
2-mercapto-4-phenylthiazole
2-mercapto-tetrahydrobenzothiazole
2-mercapto-4-methyl-5-carbethoxythiazole
2-mercapto-4-methyl-5-carbmethoxythiazole
2-mercapto-thiazole and other similar compounds. Not only single members of the foregoing series may be purified by my method, but also mixtures thereof.

The following specific example will serve more fully to illustrate the method of my invention. To 500 ml. of water containing 59 g. of sodium hydroxide there were added 200 grams of a mixture containing 85% 2-mercapto 4,5-dimethylthiazole and 15% 2-mercapto 4-ethylthiazole. Solution was complete after a short period of stirring. Steam was then blown through this solution for about 30 minutes, the temperature reaching 107° C. About 700 ml. of distillate were collected, containing a small amount of bad-smelling oil on the surface. The solution was cooled to about room temperature; about 200 g. of ice were added, and the mixture was made slightly acid by the addition of 72 g. of sulfuric acid. The resulting slurry was too thick to be stirred readily, and so 700 ml. of water were added. The solid product was removed by filtration, washed with water, and dried. There were obtained about 190 g. of a mixture of about 85% 2-mercapto-4,5-dimethylthiazole and 15% 2-mercapto-4-ethylthiazole. The product was practically free of the unpleasant odor associated with the starting material.

In order to compare the prevulcanization tendencies of rubber composition containing the purified accelerator with one containing the unpurified accelerator, the following rubber compositions were prepared:

|  | A | B |
|---|---|---|
| Rubbery copolymer of 75 parts of butadiene with 25 parts of styrene | 100 | 100 |
| Zinc oxide | 10 | 10 |
| Carbon black | 50 | 50 |
| Sulfur | 2.0 | 2.0 |
| Antioxidant | 1.0 | 1.0 |
| Mercaptans of specific example before purification | 1.75 |  |
| Mercaptans of specific example after purification |  | 1.75 |

These compositions were then heated in a press at 220° F. and the tensile strength of the resulting product was measured in pounds per square inch. The results were as follows.

| Time of vulcanization in minutes | Tensile strength | |
| --- | --- | --- |
| | A | B |
| 30 | 800 | 0 |
| 60 | 1,200 | 0 |

Inasmuch as 220° F. is the usual processing temperature for rubber compositions, it is clear that the unpurified accelerator has a much greater tendency to cause prevulcanization. When heated to the usual vulcanizing temperatures, however, that is from about 275 to 300° F., the purified accelerator is fully as effective as the unpurified in producing acceleration.

Although I have described the process in which sodium hydroxide is employed, other alkali metal hydroxides may also be used. It is usually desirable to have present a slight excess, up to about 10%, of the alkali. The steam distillation of the alkaline solution may be carried out either at atmospheric pressure or at reduced pressure, although there appears to be no particular advantage in employing the reduced pressure. It has been found that continuing the steam distillation for about 30 minutes is sufficient to remove practically all of the impurities, although traces can be obtained even after as long as two or three hours. Treatment for a shorter period of time, of course, does not remove so much of the impurity, but does have an appreciable effect upon the properties of the product.

It should be noted that it is desired in many cases to treat the mercaptothiazole with other reagents in order to produce other accelerators containing the thiazole nucleus. If the impurities present in the original mercaptothiazole are not removed before such reaction, it frequently happens that these impurities appear also in the reaction product. The impurities have the same bad effect upon the new accelerator as they had in the original mercaptothiazole. When it is desired to use the mercaptothiazole to produce other accelerators, it is therefore desirable to purify the mercaptothiazole before carrying out the reaction. In such cases it is frequently unnecessary to isolate the pure mercaptothiazole, but instead the purified alkaline solution may be employed. However, if it is desired to isolate the mercaptothiazole as such, it is preferable to carry out the acidification of the alkaline solution at a fairly low temperature—that is below about 40° C. If the acidification is carried out at higher temperatures, the product tends to be dark in color. Although any acid may be used to neutralize the alkaline solution, the most convenient, of course, are the strong mineral acids.

Although I have herein described specific embodiments of my invention, I do not intend to limit myself solely thereto, but only to the spirit and scope of the appended claims.

I claim:

1. In the process of purifying a mercaptothiazole having the structure

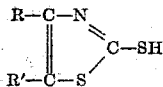

in which R and R' are members of the class consisting of hydrogen, hydrocarbon, and alkoxy groups, the step which comprises passing a stream of water vapor through an aqueous solution comprising said mercaptan dissolved in an aqueous alkali metal hydroxide solution.

2. In the process of purifying a mercaptoalkylthiazole, the step which comprises passing a stream of water vapor through an aqueous solution comprising said mercaptan dissolved in an aqueous alkali metal hydroxide solution.

3. In the process of purifying a mercaptoalkylthiazole, the steps which comprise passing a stream of water vapor through an aqueous solution comprising said mercaptan dissolved in an aqueous alkali metal hydroxide solution and neutralizing said solution with an acid.

4. In the process of purifying 2-mercapto-4,5 dimethylthiazole, the step which comprises passing a stream of water vapor through an aqueous solution comprising said mercaptan dissolved in an aqueous alkali metal hydroxide solution.

5. In the process of purifying 2-mercapto-4-ethylthiazole, the step which comprises passing a stream of water vapor through an aqueous solution comprising said mercaptan dissolved in an aqueous alkali metal hydroxide solution.

6. In the process of purifying 2-mercapto-4,5 dimethylthiazole, the steps which comprise passing a stream of water vapor through an aqueous solution comprising said mercaptan dissolved in an aqueous alkali metal hydroxide solution and neutralizing said solution with an acid.

7. In the process of purifying 2-mercapto-4-ethylthiazole, the steps which comprise passing a stream of water vapor through an aqueous solution comprising said mercaptan dissolved in an aqueous alkali metal hydroxide solution and neutralizing said solution with an acid.

ROGER A. MATHES.